(12) United States Patent
Florkey et al.

(10) Patent No.: US 8,980,102 B2
(45) Date of Patent: Mar. 17, 2015

(54) COOKING MEDIUM SYSTEMS HAVING A SINGLE FILL MANIFOLD, AND METHODS OF SUPPLYING A COOKING MEDIUM USING SUCH SYSTEMS

(75) Inventors: Edward J. Florkey, Vandalia, OH (US); Joseph J. Tiszai, Fairfield, OH (US)

(73) Assignee: Henny Penny Corporation, Eaton, OH (US)

( * ) Notice: Subject to any disclaimer, the term of this patent is extended or adjusted under 35 U.S.C. 154(b) by 475 days.

(21) Appl. No.: 12/575,916

(22) Filed: Oct. 8, 2009

(65) Prior Publication Data
US 2010/0116345 A1 May 13, 2010

Related U.S. Application Data

(60) Provisional application No. 61/103,891, filed on Oct. 8, 2008.

(51) Int. Cl.
*A47J 37/12* (2006.01)
*B01D 37/00* (2006.01)

(52) U.S. Cl.
CPC .................................. *A47J 37/1223* (2013.01)
USPC ........... 210/741; 210/232; 210/805; 210/134; 99/408; 99/330; 99/403; 99/331; 99/332; 99/336; 99/404; 99/405; 99/406; 99/407; 99/409; 99/410; 99/411; 99/412; 99/413; 99/414; 99/415; 99/416; 99/417; 99/418; 426/233; 426/438

(58) Field of Classification Search
USPC .......................................................... 99/330
See application file for complete search history.

(56) References Cited

U.S. PATENT DOCUMENTS

| | | | |
|---|---|---|---|
| 4,502,373 A | 3/1985 | Keating | |
| 5,617,777 A * | 4/1997 | Davis et al. | 99/408 |
| 5,776,530 A | 7/1998 | Davis et al. | |
| 6,009,794 A | 1/2000 | Casey et al. | |
| 6,202,543 B1 | 3/2001 | Moya et al. | |
| 6,254,790 B1 | 7/2001 | King et al. | |
| 6,470,794 B2 * | 10/2002 | Takahashi | 99/408 |
| 7,938,959 B1 * | 5/2011 | Inman et al. | 210/167.28 |
| 2006/0130670 A1 | 6/2006 | Johnson et al. | |
| 2008/0121578 A1 | 5/2008 | Burkett et al. | |
| 2010/0300980 A1 | 12/2010 | Burkett et al. | |
| 2010/0326288 A1 | 12/2010 | Tiszai et al. | |

* cited by examiner

*Primary Examiner* — Allison Fitzsimmons
(74) *Attorney, Agent, or Firm* — Baker Botts L.L.P.

(57) ABSTRACT

A system for delivering a cooking medium of a cooking apparatus includes one or more cooking vessels. The system also includes a drain manifold in fluid communication with the cooking vessel, and a fill manifold having input valves, and output valves in fluid communication with a corresponding cooking vessel. A first flow path is connected to the fill manifold. A filter container selectively is in fluid communication with the fill manifold. A filter pump is positioned between the filter container and the fill manifold and conveys a recycled cooking medium. An overflow pump selectively is in fluid communication with the fill manifold via a second flow path and a portion of the first flow path. The overflow pump conveys a new cooking medium to the fill manifold. The first flow path conveys one of the recycled cooking medium and the new cooking medium to the fill manifold.

4 Claims, 3 Drawing Sheets

COOKING MEDIUM SYSTEMS HAVING A SINGLE FILL MANIFOLD, AND METHODS OF SUPPLYING A COOKING MEDIUM USING SUCH SYSTEMS

CROSS-REFERENCE TO RELATED APPLICATIONS

This application claims the benefit of U.S. Provisional Application No. 61/103,891, filed Oct. 8, 2008. Moreover, the disclosures of Patent Publication Nos. US 2008/0121115 A1 and US 2008/0121578 A1 are hereby incorporated by reference in their entirety.

BACKGROUND OF THE INVENTION

1. Field of the Invention

The present invention relates generally to systems and methods for automatically filtering a cooking medium in a cooking apparatus, such as a fryer.

2. Description of Related Art

Known fryers, e.g., open-well fryers and pressure fryers, are used to cook various food products, e.g., poultry, fish, potato products, and the like. Such fryers may include one or more cooking vessels, e.g., fryer pots, which may be filled with a cooking medium, e.g., an oil, a liquid shortening, or a meltable-solid shortening. Such fryers also include a heating element, e.g., an electrical heating element, such as a heating oil medium, or a gas heating element, such as a gas burner and gas conveying tubes, which heat the cooking medium in the cooking vessel. The amount of time sufficient to cook or to complete the cooking of the food product at a given cooking temperature depends on the type of food product which is cooked. Moreover, the cooking medium may be used during several cooking cycles before the cooking medium inside the cooking vessel is filtered, replaced, or supplemented with a new or filtered supply of cooking medium.

This process may require a plurality of tanks, each containing a cooking medium, and each tank having its own regulation system. Additionally, open-well fryers may use a manifold to distribute cooking medium to a plurality of cooking vessels in each fryer. Thus, in a known system, for each tank of cooking medium, a separate manifold and control system may be used to regulate the amount of cooking medium in a cooking vessel. This plurality of multiple manifolds and structures, e.g., piping, actuators, solenoids, and controllers, used to operate and regulate the manifolds, may add complexity to the fryer design.

Cooking medium may be filtered periodically to maintain cooking quality and to prolong the operational lifetime of the cooking medium. The filtering process removes cooking by-product, e.g., suspended food particles, ranging from dust-sized particles to larger pieces of crackling and small pieces of food product. Nevertheless, when this cooking medium is returned to the frypot, the filtering process may reduce the amount of cooking medium remaining in the frypot. If the amount of cooking medium drops below a predetermined level, then food that is cooked in the frypot may not be cooked completely or consistently, and the quality of food cooked in the fryer may diminish.

Referring to FIG. 1, a fryer apparatus 10 includes a known manual cooking filtering system is depicted. Fryer apparatus 10 includes a frypot 16 having an open top 14 for receiving a food product. A cabinet 20, shown without a door for illustrative purposes, has brackets 32 supporting a drain pan 30 having a filter (not shown). Drain pan 30 includes a handle 34 that allows drain pan 30 to be removed from cabinet 20 for cleaning. Drain pan 30 is fluidly connected to frypot 16 via a drain line 24 and a filter pipe 28. A filter pump 27 is positioned on filter pipe 28, for drawing cooking medium into frypot 16 from pan 30. Frypot 16 includes a drain valve handle 22 that operates a drain valve (not shown) for selectively permitting cooking medium to drain from frypot 16 via drain line 24.

Frypot 16 also includes a filter valve handle 26 that operates a filter valve (not shown) for selectively permitting the introduction of cooking medium to frypot 16 from drain pan 30. In a system with multiple frypots, each frypot may be designated for cooking a different food product, e.g., chicken, "french-fried potatoes," and fish. The flavor characteristics of each of these food products may become infused to a greater or a lesser degree in the cooking medium. As a result, mixing cooking medium from frypots designated for different food products during filtering and replacement may adversely affect food quality, e.g., cooking chicken in a significant quantity of fish-flavored cooking medium may result in, e.g., "fish-flavored" chicken.

To avoid mixing multiple types of cooking media in a vessel, known fryer systems use an additional manifold to regulate the return of the cooking medium to the fryer from which the cooking medium was filtered. In the known fryer, this manifold is added to the system in addition to the manifold used to distribute new cooking medium to each frypot to maintain a consistent level of cooking medium in each frypot. These additional parts cause the fryer to take up a larger space than what otherwise would be necessary. Further, the additional piping and cooking medium routing elements require more cooking medium than otherwise would be necessary. Known fryers may have a large cooking capacity, and may require many liters of cooking medium in order to properly cook the various food products. Therefore, known fryers often are operated with less expensive cooking media, e.g., vegetable and corn cooking medium.

Nevertheless, in recent years, as demand for healthier food increases, food suppliers have begun to replace less expensive cooking media with more expensive, healthier cooking media. One such change is the recent demand for cooking media with zero trans fats. This specific type of cooking medium is more expensive than other known cooking media, and it may be desirable to have a system that uses a reduced volume of cooking medium.

SUMMARY OF THE INVENTION

Therefore, a need has arisen for systems and methods for a cooking apparatus that overcome these and other shortcomings of the related art. A technical advantage of the present invention is that a single manifold used by a plurality of input tanks of cooking medium may reduce the size and complexity of the fryer. Additionally, by routing a plurality of input tanks of cooking medium through the fill manifold, including the tank designated to "top-off" or maintain a predetermined amount of cooking medium in the cooking vessels, sensors on the fill manifold may accurately determine when a tank of cooking medium is substantially empty, and may need replacement. Yet another technical advantage of the invention is that more precise control of the filtering cooking medium may be achieved. Still another advantage is that by accurately determining the amount of cooking medium remaining, and by reducing the amount of piping and internal cooking medium routing, less cooking medium is required to cook the same amount of food, which may allow the use of a higher-quality cooking medium.

In an embodiment of the invention, a system for delivering a cooking medium of a cooking apparatus comprises at least one cooking vessel, a drain manifold configured to be in fluid communication with the at least one cooking vessel, a fill manifold comprising an input valve and a plurality of output valves, wherein each of the plurality of output valves places the fill manifold in fluid communication with a corresponding one of the at least one cooking vessel, a first flow path connected to the input valve of the fill manifold, a filter container configured to selectively be in fluid communication with the fill manifold via the first flow path, a filter pump positioned between the filter container and the fill manifold and configured to selectively be in fluid communication with the fill manifold via the first flow path, and to convey a recycled, e.g., a filtered, cooking medium, an overflow pump configured to selectively be in fluid communication with the fill manifold via a second flow path and at least one portion of the first flow path, and to convey a new cooking medium to the fill manifold, and a controller configured to control the first fluid flow path to selectively convey one of the recycled cooking medium and the new cooking medium to the fill manifold via at least one portion of the first flow path.

In another embodiment of the invention, a method for supplying a cooking medium to a cooking apparatus comprising at least one cooking vessel, using a single fill manifold, comprises the steps of determining an amount of the cooking medium in one of the at least one cooking vessels, selecting a source of a replacement cooking medium, activating at least one first switch to configure a fluid flow path to place the source of the replacement cooking medium into fluid communication with the single fill manifold, activating a second switch to place the single fill manifold in fluid communication with the one of the at least one cooking vessel, transferring the replacement cooking medium from the source of the replacement cooking medium to the one of the at least one cooking vessel via the single fill manifold, detecting a change in pressure in the single fill manifold, and calculating the amount of replacement cooking medium present in the source of the replacement cooking medium based on the change in pressure in the single fill manifold.

Other objects, features, and advantages of the present invention will be apparent to persons of ordinary skill in the art in view of the foregoing detailed description of the invention and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Figure 1:
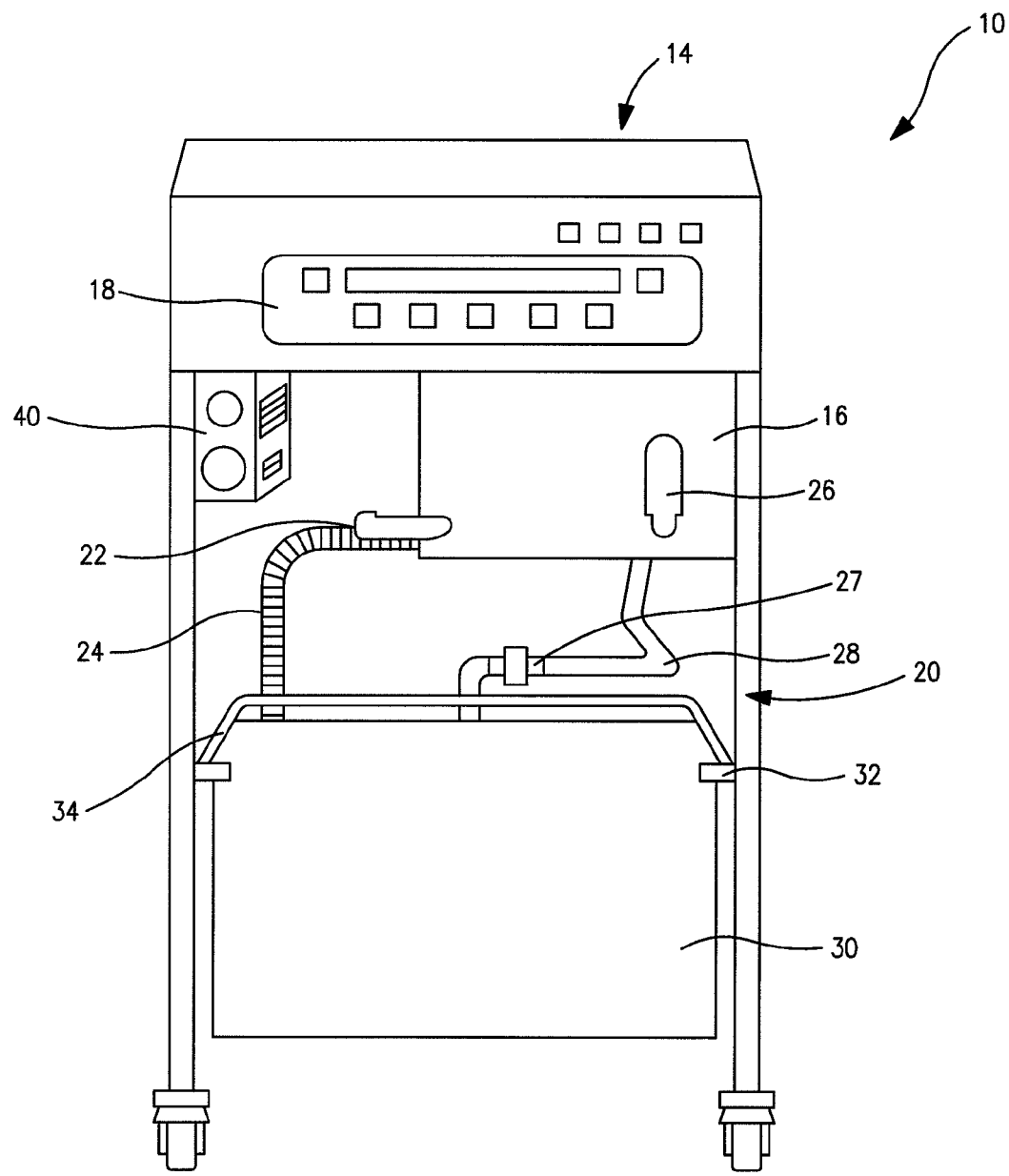
FIG. 1 is a front view of a known fryer apparatus using a plurality of fill manifolds, e.g., one fill manifold for each input tank.
Figure 2:
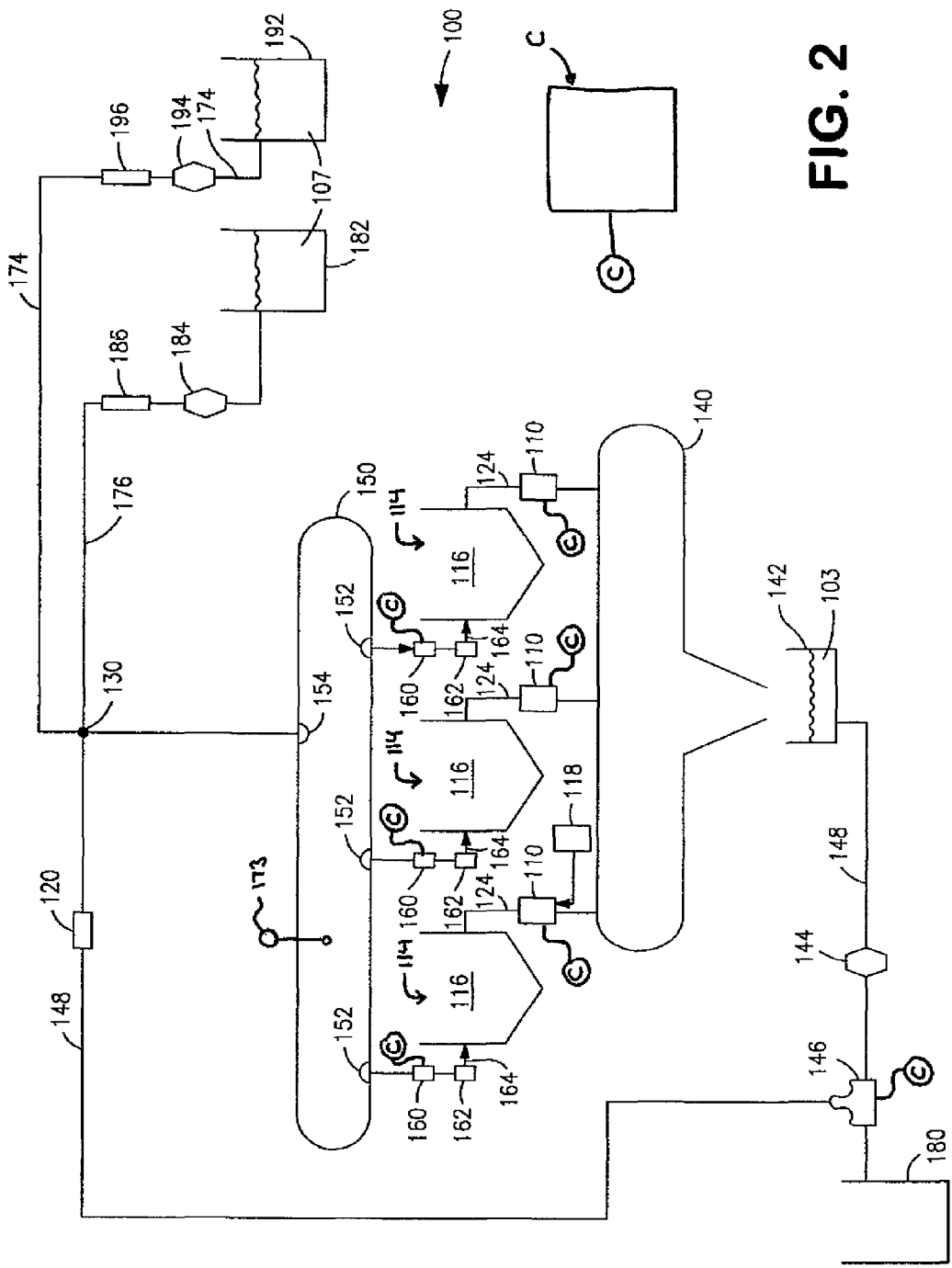
FIG. 2 is a schematic view of a cooking medium system using a single fill manifold connected to each input, according to an embodiment of the invention.
Figure 3:
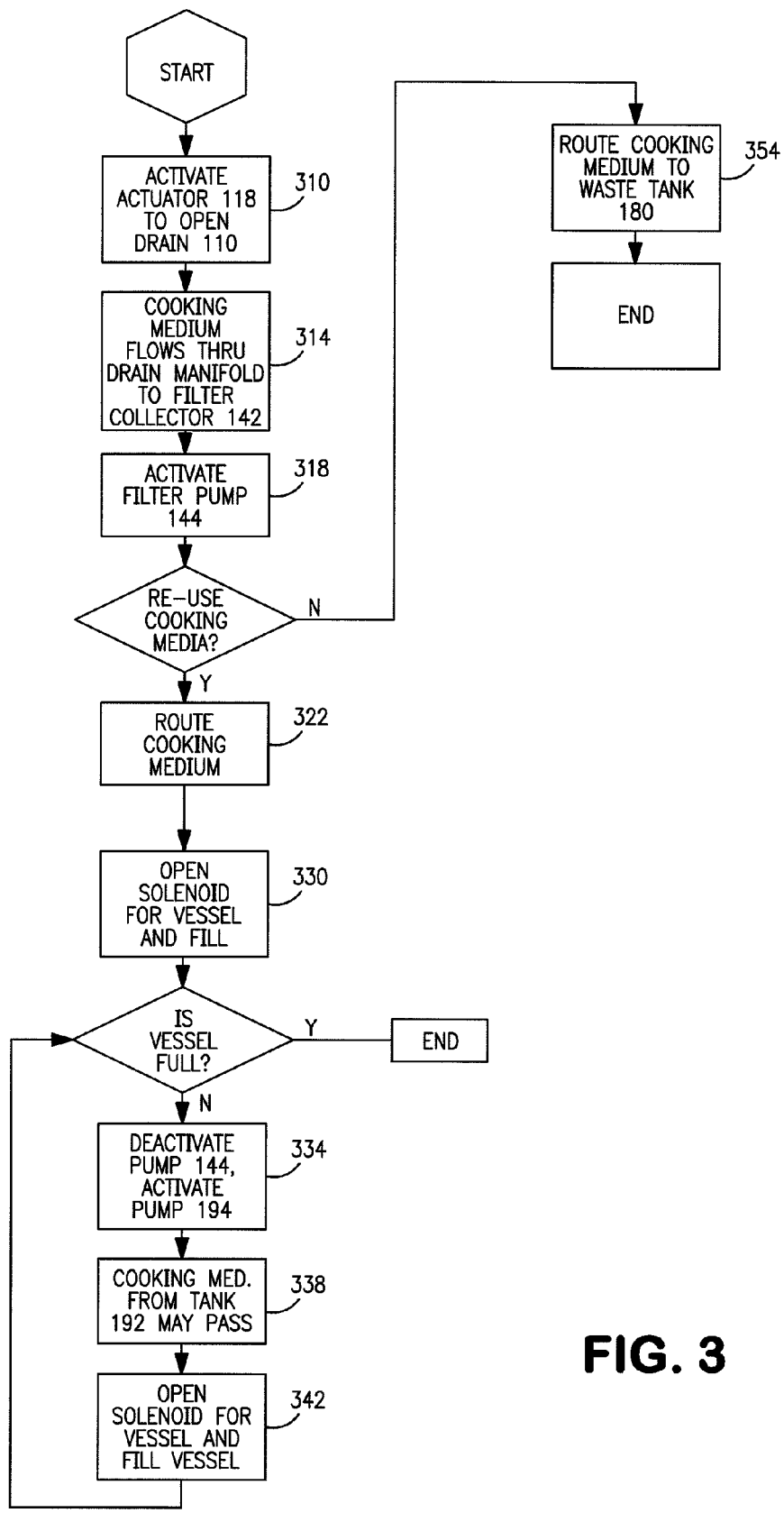
FIG. 3 is a flowchart showing a flow of processing for determining whether an input tank has a low quantity of cooking medium remaining, according to an embodiment of the invention.

Preferred embodiments of the present invention, and their features and advantages, may be understood by referring to FIGS. 2-3, like numerals being used for corresponding parts in the various drawings.

FIG. 2 shows a cooking medium system, such as a fryer apparatus 100, according to an embodiment of the present invention. Fryer apparatus 100 may comprise at least one cooking vessel 116, e.g., a frypot, which may be configured to hold a cooking medium, e.g., an oil, a liquid shortening, a meltable-solid shortening, or the like. Cooking vessel 116 may have an opening 114 for receiving a food product. A heating element (not shown), e.g., a heating oil medium, a gas jet, or the like, may be positioned within cooking vessel 116. The heating element may apply heat to the cooking medium within vessel 116 until the cooking medium reaches a predetermined temperature, and also may apply heat to maintain the cooking medium within vessel 116 at a predetermined temperature. Fryer apparatus 100 may be configured for use in a gas or electric fryer apparatus. Although vessel 116 may be suitable for an open-well fryer, cooking medium system 100 also may be used in a pressure fryer.

Cooking vessel 116 may comprise a drain at an inlet of a drain path 124, which may be fluidly connected to vessel 116 at a first end and to a drain manifold 140 at a second end opposite the first end. Drain manifold 140 also may be a container, e.g., a drain pan or a filter canister. A drain valve 110, which may be a solenoid valve, may be positioned on drain path 124, and may be configured to selectively permit cooking medium to drain from vessel 116 in response to a control signal from a controller C. Drain valve 110 may be a linearly actuated valve, which may reduce the likelihood that cooking by-product present in the cooking medium may obstruct drain valve 110. Cooking medium may pass through drain manifold 140 into filter container 142, where it may be stored as recycled cooking medium 103.

Filter pump 144 may be positioned in filter path 148, and may pump recycled cooking medium 103 through filter path 148. Three-way switch 146 also may be positioned in filter path 148. If recycled cooking medium 103 is to be reused, then three-way switch 146 may direct recycled cooking medium 103 to return to a fill manifold 150. At fill manifold 150, recycled cooking medium 103 may be returned to vessel 116 from which recycled cooking medium 103 previously was located. Fill manifold 150 may supply vessel 116 with new or recycled cooking medium, and may comprise a manifold pressure sensor 173 which may detect the pressure inside fill manifold 150. This pressure detection may be used to determine whether any of the tanks of new cooking medium are substantially empty. A second filter container (not shown) may be a backup or redundancy filter, and the second filter container also may be connected to paths 124 and 148. The second filter container may be used if a filter in filter container 142 requires maintenance or replacing, or otherwise malfunctions.

If recycled cooking medium 103 is not to be reused, then three-way switch 146 may direct recycled cooking medium 103 to a waste tank 180. Waste tank 180 may be remote from the rest of cooking system 100 to allow expedited access for removal, cleaning, and disposal. Three-way switch 146 may be electrically controlled by controller C, and may be configured to automatically send recycled cooking medium 103 to waste tank 180 after recycled cooking medium 103 has been recycled a predetermined number of times. In another embodiment of the present invention, controller C may be configured to send recycled cooking medium 103 to waste tank 180 for removal and disposal after each cooking cycle.

A check valve 120 may be positioned in filter path 148. Check valve 120 may be configured to open if filter pump 144 provides a sufficient amount of pressure in filter path 148 to open check valve 120. Once recycled cooking medium 103 passes check valve 120, recycled cooking medium 103 may reach a selection valve 130, which may be configured to supply fill manifold 150 with cooking medium.

A new cooking medium tank 182 also may be configured to supply new cooking medium 107 to fill manifold 150, via new cooking medium path 176, selection valve 130, and common path 134. New cooking medium path 176 may be fluidly connected to new cooking medium tank 182 at a first end, and may be fluidly connected to selection valve 130 at a second end opposite the first end. A new cooking medium pump 184 may be positioned in new cooking medium path 176 between selection valve 130 and new cooking medium tank 182. New cooking medium pump 184 may be configured to pump new cooking medium 107 from new cooking medium tank 182 to selection valve 130. A check valve 186 may be positioned in new cooking medium path 176 between selection valve 130 and new cooking medium pump 184, in order to prevent new cooking medium 107 from reaching selection valve 130 when new cooking medium pump 184 is turned off.

Similarly, supplemental tank 192 also may be configured to supply new cooking medium 107 to fill manifold 150, via supplemental cooking medium path 174, selection valve 130, and common path 134. Supplemental path 174 may be fluidly connected to supplemental tank 192 at a first end, and may be fluidly connected to selection valve 130 at a second end opposite the first end. A supplemental tank pump 194 may be positioned in supplemental path 174 between selection valve 130 and supplemental tank 192. Supplemental pump 194 may be configured to pump new cooking medium 107 from supplemental tank 192 to selection valve 130. A check valve 196 may be positioned in supplemental path 174 between selection valve 130 and supplemental pump 194, in order to prevent new cooking medium 107 from reaching selection valve 130 when supplemental pump 194 is turned off.

Selection valve 130 may be configured to allow one of recycled cooking medium 103 and new cooking medium 107 to pass through common path 134 to inlet valve 154 of fill manifold 150. Once in fill manifold 150, the cooking medium may be transferred through one of a plurality of outlet valves 152, into fill paths 164. A fill solenoid 160 and a check valve 162 may be positioned in each fill path 164 of each respective vessel 116. Controller C may be configured to open the respective fill solenoid 160 for the tank to which a cooking medium is to be added. The cooking medium then may flow from fill manifold 150 through fill path 164 to check valve 162. The pressure from the cooking medium from fill manifold 150 may cause check valve 162 to open, and the cooking medium to flow into the respective vessel 116.

After a predetermined amount of time, or a predetermined amount of usage, the cooking medium in respective vessel 116 may require filtering or replacement. In this condition, controller C may cause actuator 118 to open respective drain valve 110, and allow the cooking medium to flow through drain path 124, at which point the cycle may begin again.

FIG. 3 describes a method for adding cooking medium to at least one vessel 116, according to an embodiment of the invention. At Step 310, actuator 118 may be activated, which causes drain 110 of corresponding vessel 116 to open. After drain 110 opens, at Step 314, the cooking medium in vessel 116 may travel along flow path 124 to drain manifold 140, where the cooking medium may be collected at filter container 142. At Step 318, filter pump 144 may be activated. If the cooking medium is to be re-used, e.g., the cooking medium is to be returned to vessel 116, then at Step 322, the cooking medium may be routed to selection valve 130 via 3-way switch 146. At Step 326, selection valve 130 may be opened, and the cooking medium may flow through common path 134 to inlet valve 154 of fill manifold 150. At Step 330, controller C may activate solenoid 162 for the corresponding vessel 116, and the cooking medium may flow into vessel 116.

If vessel 116 now is full, e.g., within the predetermined limits for cooking conditions, then processing stops. If vessel 116 now is not full, then at Step 334, pump 144 may be deactivated, if it has not already been deactivated, and supplemental tank pump 194 may be activated. At Step 338, selection Valve 130 may be opened, and may be configured to allow cooking medium from supplemental tank 192 to flow past check valve 196 and into inlet valve 154 of fill manifold 150. As before, at Step 342, controller C may activate solenoid 162 for the corresponding vessel 116, and the cooking medium may flow into vessel 116. At Step 346, pressure sensor 173 may monitor the pressure inside fill manifold 150. If pressure sensor 173 detects a fluctuation in the fill manifold 150, e.g., a "spike" in pressure due to adding cooking medium to the system, then the process of adding cooking medium into vessel 116 may continue until vessel 116 reaches a predetermined level of cooking medium. If pressure sensor 173 does not detect a fluctuation in the fill manifold 150, then at Step 350 a notification may be sent, indicating that the supplemental tank may be empty.

If, after Step 318, the cooking medium may not be re-used, then at Step 5354, the cooking medium may be routed to waste tank 180 by 3-way switch 146. In this instance, the cooking medium may be stored in waste tank 180 until it is removed from the system.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A system for delivering a cooking medium of a cooking apparatus, comprising:
    at least one cooking vessel;
    a drain manifold configured to be in fluid communication with the at least one cooking vessel;
    a fill manifold comprising an input valve and a plurality of output valves, wherein each of the plurality of output valves places the fill manifold in fluid communication with a corresponding one of the at least one cooking vessel;
    a first flow path connected to the input valve of the fill manifold, such that the input valve connects the first flow path to the fill manifold which is separate from the first flow path;
    a filter container configured to selectively be in fluid communication with the fill manifold via a selection valve on the first flow path, wherein the selection valve is upstream of the input valve of the fill manifold;
    a filter pump positioned between the filter container and the fill manifold and configured to selectively be in fluid communication with the fill manifold via the selection valve on the first flow path, and to convey a recycled cooking medium;
    an overflow pump configured to selectively be in fluid communication with the fill manifold via the selection valve and via a second flow path and at least one portion of the first flow path, and to convey a new cooking medium to the fill manifold;

a flow switching mechanism configured to selectively convey the recycled cooking medium to at least one of the selection valve and a third flow path connected to a waste tank; and a controller configured to control the selection valve to selectively convey one of the recycled cooking medium and the new cooking medium to the fill manifold via at least one portion of the first flow path.

2. The system of claim 1, wherein the second flow path is connected to the first flow path via the selection valve.

3. The system of claim 2, wherein the controller is configured to operate the selection valve to select and to convey one of the new cooking medium and the recycled cooking medium to the input valve.

4. The system of claim 1, further comprising a fourth flow path configured to be selectively in fluid communication with the at least one portion of the first flow path, and configured to receive the new cooking medium, wherein when the controller selects to convey the new cooking medium to the fill manifold via the at least one portion of the first flow path, the controller is configured to selectively convey the new cooking medium to the at least one portion of the first flow path via one of the second flow path and the fourth flow path.

* * * * *